(12) United States Patent
Hung

(10) Patent No.: US 8,476,877 B2
(45) Date of Patent: Jul. 2, 2013

(54) FUEL CELL SYSTEM AND POWER MANAGEMENT METHOD THEREOF

(75) Inventor: Kuo-Tai Hung, Hsinchu (TW)

(73) Assignee: Young Green Energy Co., Hsinchu County (TW)

( * ) Notice: Subject to any disclaimer, the term of this patent is extended or adjusted under 35 U.S.C. 154(b) by 757 days.

(21) Appl. No.: 12/754,615

(22) Filed: Apr. 6, 2010

(65) Prior Publication Data

US 2010/0261086 A1 Oct. 14, 2010

(30) Foreign Application Priority Data

Apr. 8, 2009 (TW) ................................ 98111738 A

(51) Int. Cl.
*G05F 1/00* (2006.01)
(52) U.S. Cl.
USPC ......................................................... 323/271
(58) Field of Classification Search
USPC .................. 323/207, 234, 271, 282; 429/430, 429/431, 432; 700/286, 295, 297; 307/153; 320/10
See application file for complete search history.

(56) References Cited

U.S. PATENT DOCUMENTS

| 2003/0091882 A1* | 5/2003 | Schmidt et al. ................. 429/23 |
| 2006/0210843 A1* | 9/2006 | Masse et al. .................... 429/13 |
| 2007/0134528 A1* | 6/2007 | Kim et al. ........................ 429/23 |
| 2008/0032165 A1 | 2/2008 | Yamaguchi |
| 2008/0036432 A1 | 2/2008 | Takada et al. |
| 2008/0070073 A1* | 3/2008 | Petersen et al. ................. 429/22 |

FOREIGN PATENT DOCUMENTS

| TW | 200633342 A | 9/2006 |
| TW | I274454 | 2/2007 |
| TW | 200727255 | 7/2007 |
| TW | 200727255 A | 7/2007 |
| TW | 200743240 | 11/2007 |
| TW | 200743240 A | 11/2007 |

OTHER PUBLICATIONS

Taiwan Official Action issued on Aug. 20, 2012.

* cited by examiner

*Primary Examiner* — Timothy J Dole
*Assistant Examiner* — Afework Demisse
(74) *Attorney, Agent, or Firm* — Chun-Ming Shih

(57) ABSTRACT

A fuel cell system and a power management method thereof are provided. The fuel cell system includes a fuel cell power generation part, a switch circuit, a load supply circuit, a status detector, an electronic load circuit, and a control circuit. An input terminal and an output terminal of the switch circuit are respectively coupled to the power generation part and the load supply circuit. The status detector is coupled to a node between the power generation part and the input terminal to detect an output voltage of the power generation part. The electronic load circuit is coupled to a node between the power generation part and the input terminal to perform a current-sinking operation. The control circuit is for generating a first and a second control signals respectively for switching the on-off states of the switch circuit and controlling the current-sinking value of the electronic load circuit.

14 Claims, 4 Drawing Sheets

FUEL CELL SYSTEM AND POWER MANAGEMENT METHOD THEREOF

CROSS-REFERENCE TO RELATED APPLICATION

This application claims the priority benefit of Taiwan application serial no. 098111738, filed on Apr. 8, 2009. The entirety of the above-mentioned patent application is incorporated herein by reference and made a part of this specification.

BACKGROUND

1. Technical Field

The present invention generally relates to fuel cell technology field and, more particularly to a fuel cell system and a power management method thereof.

2. Description of the Related Art

A fuel cell makes use of the combination of hydrogen and oxygen to generate a chemical reaction and has been become as a novel energy resource for supplying electrical power. After the fuel cell is activated to achieve normal electrochemical reaction efficiency, a fuel cell power generation part of the fuel cell is required to output an electrical power with constant power so that the fuel cell may attain relatively high power generation efficiency. In addition, an output voltage of the fuel cell power generation part is inversely proportional to the output current thereof. That is, when there is no output current, the output voltage of the fuel cell power generation part is maximum; as the output current increases, the output voltage would decrease correspondingly. Moreover, in the case of the output currents are the same, the larger the output power of the fuel cell power generation part, the higher the output voltage.

A fuel cell system in the prior art includes a fuel cell power generation part and a load supply circuit. The load supply circuit is for transforming electrical power provided from the fuel cell power generation part into a specific output voltage and supplying the output voltage to an external load and/or an internal system device for use, as proposed in, for example Taiwanese Patent No. 1274454, Taiwanese Patent Publication No. 200743240 and U.S. patent Publication No. 2008/0036432, the disclosures of which are incorporated herein by references.

However, when the output power of the fuel cell power generation part is increased, voltage tolerance specifications of main circuit components (e.g., buck&boost integrated circuits) in the load supply circuit are needed to increase correspondingly, the use of many components with high voltage tolerance specification may cause increased cost for the entire fuel cell system.

BRIEF SUMMARY

The present invention provides a fuel cell system having a relatively low cost.

The present invention further provides a power management method of a fuel cell system, facilitating the fuel cell system to achieve a relatively low cost.

In order to achieve one or part of or all the objectives, or to achieve other objectives, a fuel cell system in accordance with an embodiment of the present invention is provided. The fuel cell system of the embodiment of the present invention includes a fuel cell power generation part, a switch circuit, a load supply circuit, a status detector, an electronic load circuit, and a control circuit. The switch circuit has an input terminal and an output terminal. The input terminal of the switch circuit is electrically coupled to the fuel cell power generation part. The load supply circuit is electrically coupled to the output terminal of the switch circuit and for supplying a load with electrical power. The status detector is electrically coupled to a node between the fuel cell power generation part and the input terminal of the switch circuit and for detecting electrical power provided from the fuel cell power generation part so as to obtain an output voltage of the fuel cell power generation part. The electronic load circuit is electrically coupled to a node between the fuel cell power generation part and the input terminal of the switch circuit and for performing a current-sinking operation applied to the fuel cell power generation part. The control circuit is electrically coupled to the status detector and for generating a first control and a second control signal according to the value of the output voltage of the fuel cell power generation part. The first control signal is for switching the on-off states of the switch circuit. The second control signal is for controlling a current-sinking value of the electronic load circuit from the fuel cell power generation part.

In one embodiment, the switch circuit includes a power path controller and a tri-terminal switching element. An input terminal of the tri-terminal switching element is electrically coupled to the input terminal of the switch circuit, an output terminal of the tri-terminal switching element is electrically coupled to the output terminal of the switch circuit, and a control terminal of the tri-terminal switching element is electrically coupled to the power path controller. A control pin of the power path controller is electrically coupled to receive the first control signal, so as to switch the on-off states of the tri-terminal switching element. Moreover, the tri-terminal switching element may be a P-type field effect transistor.

In one embodiment, the switch circuit further includes a NPN bipolar transistor. A base electrode of the NPN bipolar transistor is electrically coupled to receive the first control signal through a first resistor, an emitter electrode of the NPN bipolar transistor is grounded, and a collector electrode of the NPN bipolar transistor is electrically coupled to the control pin of the power path controller and further electrically coupled to the input terminal of the switch circuit through a second resistor.

In one embodiment, the load supply circuit includes an external load supply circuit and an internal load supply circuit. The external load supply circuit is for supplying electrical power to an external load. The internal load supply circuit is for supplying electrical power to an internal load of the fuel cell system.

In one embodiment, the electronic load circuit includes an operational amplifier and a tri-terminal switching element. A non-inverting input terminal of the operational amplifier is electrically coupled to receive the second control signal. An inverting input terminal of the operational amplifier is grounded through a current-sinking resistor. An output terminal of the operational amplifier is electrically coupled to the tri-terminal switching element so as to switch the on-off states of the tri-terminal switching element. An input terminal of the tri-terminal switching element is electrically coupled to the node between the fuel cell power generation part and the input terminal of the switch circuit. An output terminal of the tri-terminal switching element is grounded through the current-sinking resistor. Furthermore, the tri-terminal switching element may be an N-type field effect transistor. The non-inverting input terminal of the operational amplifier may be electrically coupled to receive the second control signal through a resistor-capacitor network or a digital-to-analog converter circuit.

In order to achieve one or part of or all the objectives, or to achieve other objectives, a power management method of a fuel cell system in accordance with another embodiment of the present invention is provided. The fuel cell system includes a fuel cell power generation part. The power management method includes the following steps: (a) detecting an output voltage of the fuel cell power generation part, comparing the output voltage with a specific voltage, and generating a first control signal according to the comparison result so as to determine the fuel cell power generation part whether to supply a load with electrical power; and (b) detecting an output voltage of the fuel cell power generation part, comparing the output voltage with an operating voltage, and generating a second control signal according to the comparison result so as to control a current-sinking value from the fuel cell power generation part.

In one embodiment, the step (a) and step (b) are performed one time at intervals, and during each time of the step (a) and step (b) are performed, the step (a) is performed prior to the step (b).

In one embodiment, the step (a) includes: when the output voltage is above the specific voltage, determining the fuel cell power generation part not to supply the load with electrical power by the first control signal; and when the output voltage is below or equal to the specific voltage, determining the fuel cell power generation to supply the load with electrical power by the first control signal.

In one embodiment, the operating voltage is a range and the step (b) includes: when the output voltage is above an upper limit of the operating voltage, increasing the current-sinking value subject to the control of the second control signal, when the output voltage is below a lower limit of the operating voltage, decreasing the current-sinking value subject to the control of the second control signal, and when the output voltage is above or equal to the lower limit and below or equal to the upper limit, maintaining the current-sinking value.

In one embodiment, the second control signal is a pulse width modulation signal.

The embodiment or the embodiments of the invention may have at least one of the following advantages. In the above-mentioned embodiments of the present invention, the switch circuit, the control circuit, and the electronic load circuit are used to constitute a switch with high voltage tolerance capability, when the output voltage of the fuel cell power generation part is above the specific voltage, the switch circuit is turn-off so as to protect the rear-stage circuit (e.g. the load supply circuit) from being damaged by excessive high voltage, and the electronic load circuit performs a current-sinking operation applied to the fuel cell power generation part so as to pull low the output voltage of the fuel cell power generation part. Whereas, when the output voltage of the fuel cell power generation part is pulled to or below the specific voltage, the switch circuit is turn-on, the fuel cell power generation part is allowed to supply the load (i.e., the external load and/or the internal load) with electrical power; at the moment, the electronic load circuit plays a auxiliary role and suitably adjusts the current-sinking value to allow the fuel cell power generation part to maintain constant power output. Accordingly, the load supply circuit in accordance with the embodiments of the present invention may use components with relatively low voltage tolerance specifications, and thus the fuel cell system may achieve the advantage of relatively low cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute part of this specification. The drawings illustrate embodiments of the invention and, together with the description, serve to explain the principles of the invention.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
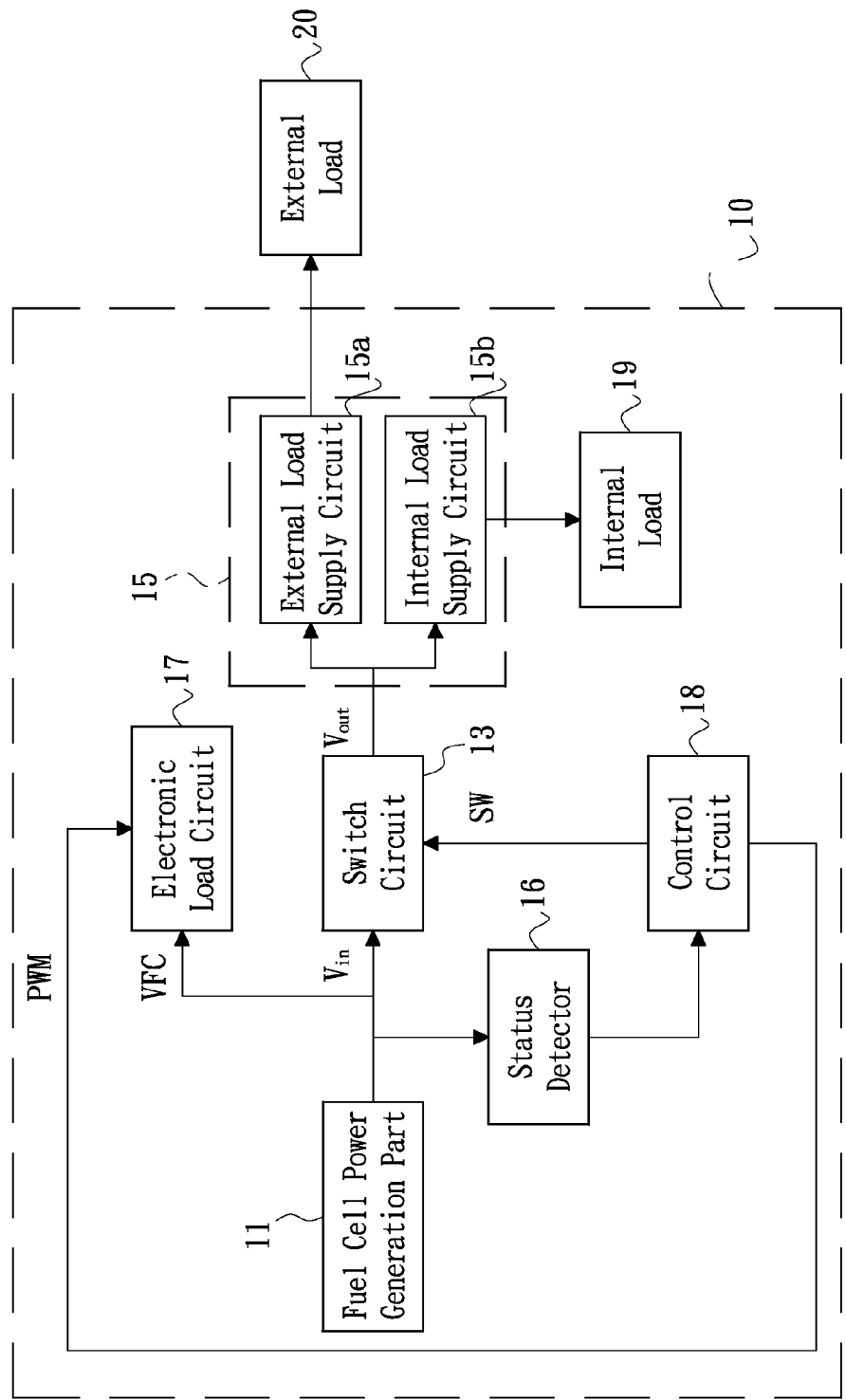
FIG. 1 is a schematic block diagram of a fuel cell system in accordance with an embodiment of the present invention.
Figure 2:
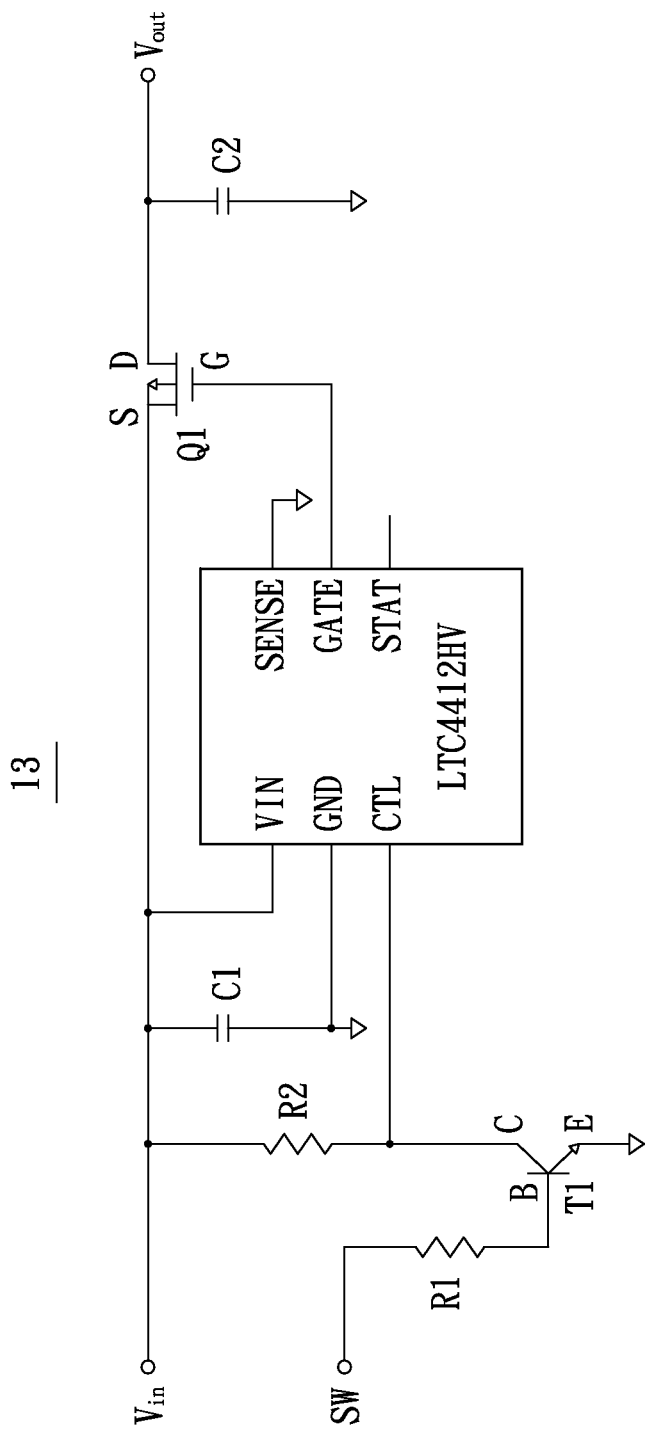
FIG. 2 is a schematic circuit diagram of a switch circuit in FIG. 1.
Figure 3:
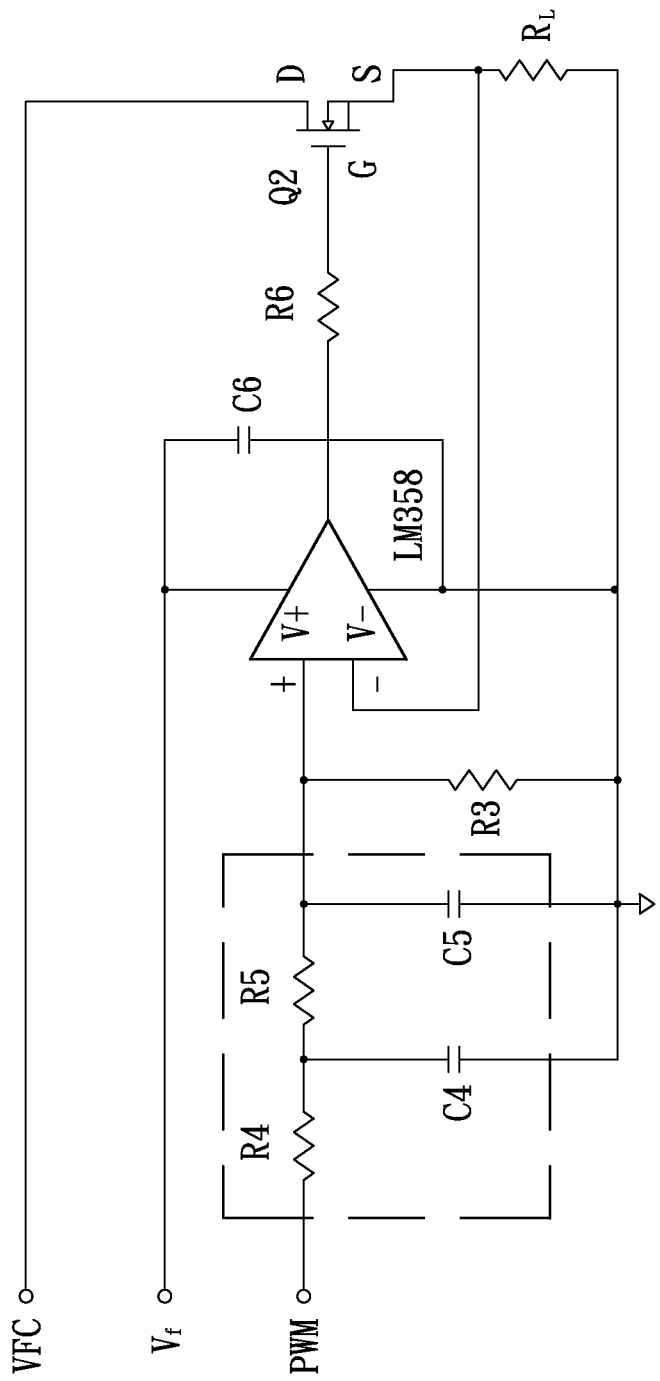
FIG. 3 is a schematic circuit diagram of an electronic load circuit in FIG. 1.

Referring to FIGS. 1 through 3, a fuel cell system 10 in accordance with an embodiment of the present invention is provided. The fuel cell system 10 includes a fuel cell power generation part 11, a switch circuit 13, a load supply circuit 15, a status detector 16, an electronic load circuit 17, a control circuit 18, and an internal load 19.

The switch circuit 13 has an input terminal and an output terminal. The input terminal of the switch circuit 13 is electrically coupled to the fuel cell power generation part 11, so as to receive an input signal Vin. The output terminal of the switch circuit 13 generates an output signal Vout. The load supply circuit 15 is electrically coupled to the output terminal of the switch circuit 13 and for supplying loads with electrical power. The load supply circuit 15 includes an external load supply circuit 15a and an internal load supply circuit 15b respectively for supplying electrical power to an external load 20 and the internal load 19 (i.e., internal system devices of the fuel cell system 10). The status detector 16 is electrically coupled to a node between the fuel cell power generation part 11 and the input terminal of the switch circuit 13. The status detector 16 is for detecting electrical power provided from the fuel cell power generation part 11, so as to obtain an output voltage of the fuel cell power generation part 11. The electronic load circuit 17 is electrically coupled to a node between the fuel cell power generation part 11 and the input terminal of the switch circuit 13. The electronic load circuit 17 is for performing a current-sinking operation applied to the fuel cell power generation part 11. The control circuit 18 is electrically coupled to the status detector 16. The control circuit 18 is for generating a first control signal SW and a second control signal PWM according to the value of the output voltage detected by the status detector 16. The first control signal SW is for switching the on-off states of the switch circuit 13. The second control signal PWM is for controlling the current-sinking value of the electronic load circuit 17 from the fuel cell power generation part 11.

Referring to FIG. 2, a schematic circuit diagram of the switch circuit 13 is shown. As illustrated in FIG. 2, the switch circuit 13 includes a power path controller LTC4412HV, a P-type field effect transistor Q1, and an NPN bipolar transistor T1.

The source electrode S of the P-type field effect transistor Q1 is electrically coupled to the input terminal of the switch circuit 13 so as to receive the input signal Vin. The source electrode S of the P-type field effect transistor Q1 is grounded through a capacitor C1. The drain electrode D of the P-type field effect transistor Q1 is electrically coupled to the output terminal of the switch circuit 13 so as to provide the output signal Vout. The drain electrode D of the P-type field effect transistor Q1 is grounded through a capacitor C2. The gate electrode G of the P-type field effect transistor Q1 is electrically coupled to a GATE pin of the power path controller LTC4412HV. In the embodiment, the P-type field effect transistor Q1 is used as a tri-terminal switching element, and the source electrode S, the drain electrode D, and the gate electrode G of the P-type field effect transistor respectively are used as an input terminal, an output terminal, and a control terminal of the tri-terminal switching element.

The power path controller LTC4412HV may be a linear power path controller. A control pin CTL of the power path controller LTC4412HV is electrically coupled to receive the first control signal SW, so as to switch the on-off states of the P-type field effect transistor Q1, a VIN pin of the power path controller LTC4412HV is electrically coupled to the input terminal of the switch circuit 13, a GND pin of the power path controller LTC4412HV is grounded, a SENSE pin of the power path controller LTC4412HV is grounded, and a STAT pin of the power path controller LTC4412HV is unconnected.

The base electrode B of the NPN bipolar transistor T1 is electrically coupled to receive the first control signal SW through a resistor R1, the emitter electrode E of the NPN bipolar transistor T1 is grounded, and the collector electrode C of the NPN bipolar transistor T1 is electrically coupled to the control pin CTL of the power path controller LTC4412HV and further electrically coupled to the input terminal of the switch circuit 13 through a resistor R2.

An operational principle of the switch circuit 13 as illustrated in FIG. 2 is as below: the on-off states of the P-type field effect transistor Q1 rely on a potential difference Vgs between the gate electrode G and the source electrode S of the P-type field effect transistor Q1, when Vgs=0, the P-type field effect transistor Q1 is turn-off, and when Vgs<Vth, the P-type field effect transistor Q1 is turn-on. The Vth is a threshold voltage of the P-type field effect transistor Q1. The power path controller LTC4412HV takes charge of controlling a voltage on the gate electrode G of the P-type field effect transistor Q1. When the control pin CTL is high level, a voltage on the GATE pin is approximately equal to the input signal Vin, and the P-type field effect transistor Q1 is turn-off; whereas when the control pin CTL is low level, a voltage on the GATE pin is approximately equal to zero, and the P-type field effect transistor Q1 is turn-on. Since the P-type field effect transistor Q1 is arranged in a main circuit of the switch circuit 13, the on-off states of the P-type field effect transistor Q1 may determine the on-off states of the switch circuit 13.

In the embodiment, since when the control pin CTL of the power path controller LTC4412HV is low level, the main circuit of the switch circuit 13 is turn-on. When the power supply is initially started, since the first control signal SW provided from the control circuit 18 being initially powered is low level, the main circuit would be transitorily turn-on in the case of the NPN bipolar transistor T1 being not configured. Therefore, the configuration of the NPN bipolar transistor T1 may make the control pin CTL to be high level when the power supply is initially started, the main circuit is turn off, and the configuration of the NPN bipolar transistor T1 may provide a protection function.

Referring to FIG. 3, a schematic circuit diagram of the electronic load circuit 17 is shown. As illustrated in FIG. 3, the electronic load circuit 17 includes an operational amplifier LM358 and an N-type field effect transistor Q2. A non-inverting input terminal (+) of the operational amplifier LM358 is electrically coupled to receive the second control signal PWM through a resistor-capacitor network (as denoted by the dashed border in FIG. 3) and further is grounded though a resistor R3, an inverting input terminal (−) of the operational amplifier LM358 is grounded through a current-sinking resistor $R_L$, another non-inverting input terminal (V+) of the operational amplifier LM358 is electrically coupled to receive a constant voltage Vf and further electrically coupled to another grounded inverting input terminal (V−) through a capacitor C6, and an output terminal of the operational amplifier LM358 is electrically coupled to the gate electrode G of the N-type field effect transistor Q2 so as to switch the on-off states of the N-type field effect transistor Q2. In the embodiment, the resistor-capacitor network is constituted by resistors R4, R5 and capacitors C4, C5.

The drain electrode D of the N-type field effect transistor Q2 is electrically coupled to the node between the fuel cell power generation part 11 and the input terminal of the switch circuit 13, so as to receive an electrical signal VFC from the fuel cell power generation part. The source electrode S of the N-type field effect transistor Q2 is grounded through the current-sinking resistor $R_L$. The N-type field effect transistor Q2 is used as a tri-terminal switching element, the drain electrode D, the source electrode S, and the gate electrode G of the N-type field effect transistor Q2 are respectively used as an input terminal, an output terminal, and a control terminal of the tri-terminal switching element.

An operational principle of the electronic load circuit 17 as illustrated in FIG. 3 is as below: the second control signal PWM provided from the control circuit 18 determines the input voltage on the non-inverting input terminal (+) of the operational amplifier LM358, the inverting input terminal (−) and the non-inverting input terminal (+) are virtually grounded, and thus the voltage on the inverting input terminal (−) is substantially equal to the voltage on the non-inverting input terminal (+). Since the inverting input terminal (−) and the current-sinking resistor $R_L$ are electrically coupled with each other, when a voltage drop on the current-sinking resistor $R_L$ is equal to the voltage drop on the inverting input terminal (−), a certain current may flow through the current-sinking resistor $R_L$, and therefore the current-sinking effect is achieved. For example, when the voltage on the inverting input terminal (−) is 0.1 volts and the current-sinking resistor $R_L$=0.15 ohms, the voltage drop on the current-sinking resistor $R_L$ would be about 0.1V and a current flowing through the current-sinking resistor $R_L$ is about 0.67 amperes.

It is indicated that the resistor-capacitor network of the electronic load circuit 18 as illustrated in FIG. 3 may be replaced by a digital-to-analog converter circuit.

Figure 4:
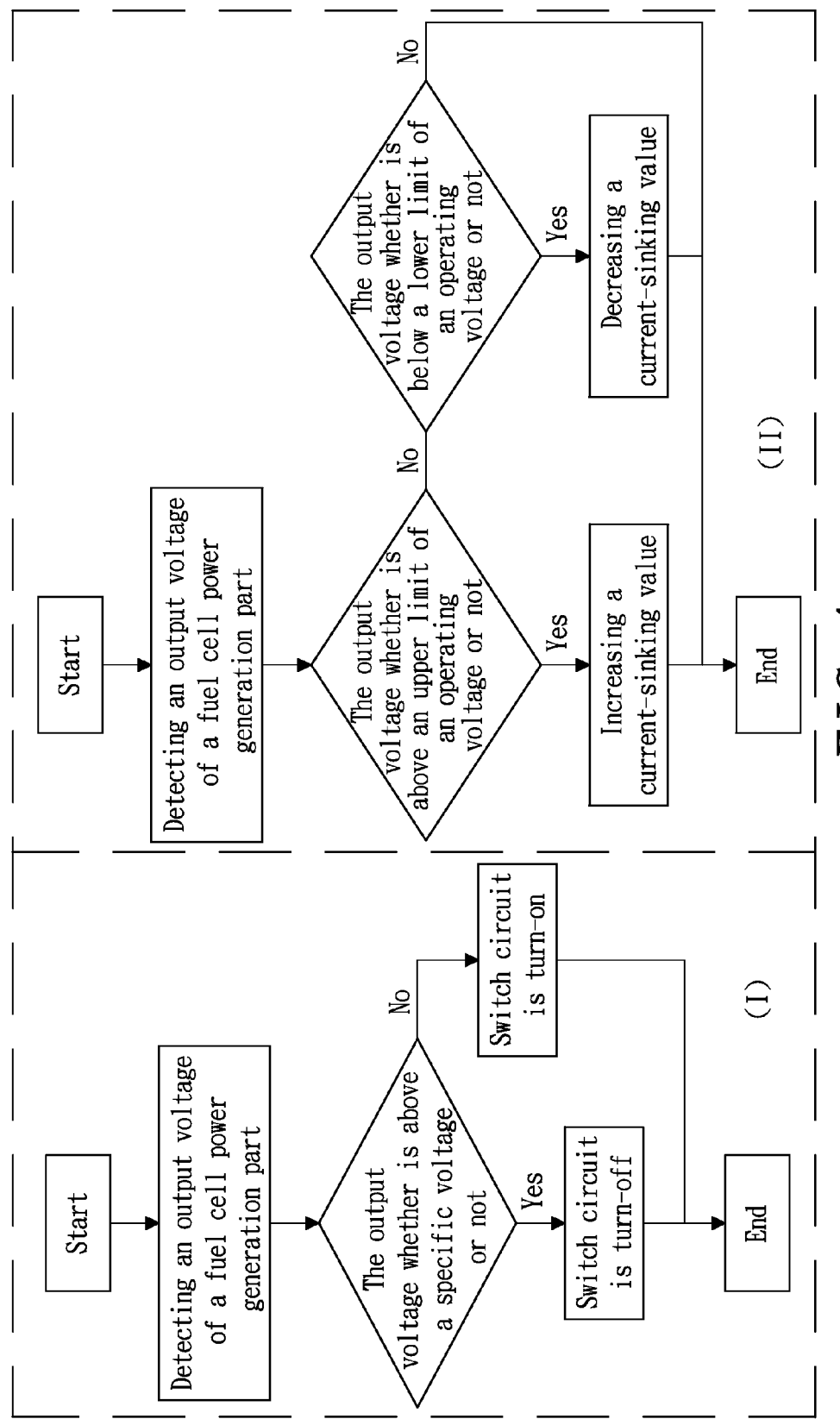
FIG. 4 is a flow chart of a power management method of a fuel cell system, in accordance with an embodiment of the present invention.

A power management method adapted to the fuel cell system 10 would be described below in detail with reference to FIGS. 1 and 4. The power management method includes the following step (I) and step (II).

Step (I): detecting an output voltage of the fuel cell power generation part 11, comparing the output voltage with a specific voltage, and generating a first control signal SW according to the comparison result so as to determine the fuel cell power generation part 11 whether to supply a load with electrical power. More specifically, when the output voltage is below the specific voltage, the switch circuit 13 is turned on under the control of the first control signal for allowing the fuel cell power generation part 11 to supply electrical power to the internal load 19 and the external load 20 through the load supply circuit 15. When the output voltage is above or equal to the specific voltage, the switch circuit 13 is turned off under the control of the first control signal SW for prohibiting the fuel cell power generation part 11 from supplying electrical power to the internal load 19 and the external load 20 through the load supply circuit 15. The specific voltage is a minimum voltage tolerance of component. Assuming that a voltage tolerance of component of the external load supply circuit 15a is 28 volts, and a voltage tolerance of component of the internal load supply circuit 15b is 20 volts, the specific voltage is set to be 20 volts.

Step (II): detecting an output voltage of the fuel cell power generation part 11, comparing the output voltage with an operating voltage, and generating a second control signal PWM according to the comparison result so as to control a current-sinking value from the fuel cell power generation part 11. In particular, the operating voltage is a range. When the output voltage is above an upper limit of the operating voltage, the current-sinking value from the fuel cell power generation part 11 is increased subject to the control of the second control signal PWM. When the output voltage is below a lower limit of the operating voltage, the current-sinking value from the fuel cell power generation part 11 is decreased subject to the control of the second control signal PWM. When the output voltage falls in the range of the operating voltage, the current-sinking value from the fuel cell power generation part 11 is maintained subject to the control of the second control signal PWM. In the embodiment, the second control signal PWM is a pulse width modulation signal. Since the operating voltage is set to be a range, the output voltage of the fuel cell power generation part 11 is maintained in the range e.g., 13~13.1 volts.

In the embodiment, regardless of the switch circuit 13 whether is conducted or not, the step (I) and step (II) are performed one time at intervals, and during each time of the step (I) and step (II) are performed, the step (I) is performed prior to the step (II).

In summary, the embodiment or the embodiments of the invention may have at least one of the following advantages. In the above-mentioned embodiments of the present invention, the switch circuit, the control circuit, and the electronic load circuit are used to constitute a switch with high voltage tolerance capability. When the output voltage of the fuel cell power generation part is above the specific voltage, the switch circuit is turn-off so as to protect the rear-stage circuit (e.g. the load supply circuit) from being damaged by excessive high voltage. The electronic load circuit performs a current-sinking operation applied to the fuel cell power generation part so as to pull low the output voltage of the fuel cell power generation part. Whereas, when the output voltage of the fuel cell power generation part is pulled to or below the specific voltage, the switch circuit is turn-on, and the fuel cell power generation part is allowed to supply the load (i.e., the external load and/or the internal load) with electrical power. At the moment, the electronic load circuit plays an auxiliary role and suitably adjusts the current-sinking value to allow the fuel cell power generation part to maintain constant power output. Therefore, the load supply circuit in accordance with the embodiment of the present invention may use components with relatively low voltage tolerance specifications, and thus the components used for the switch circuit, the control circuit, and the electronic load circuit are easily obtained. Accordingly, the fuel cell system in accordance with the embodiment of the present invention may achieve the advantage of relatively low cost.

In addition, the skilled person in the art may make some modifications with respect to various circuits in accordance with the above-mentioned embodiments of the present invention, e.g., replacing the P-type field effect transistor of the switch circuit by a bipolar transistor, or replacing the control circuit by a comparator. Such modifications ought to be included within the spirit and scope of the present invention.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fuel cell system comprising:
a fuel cell power generation part;
a switch circuit having an input terminal and an output terminal, wherein the input terminal is electrically coupled to the fuel cell power generation part;
a load supply circuit electrically coupled to the output terminal of the switch circuit and for supplying a load with electrical power;
a status detector electrically coupled to a node between the fuel cell power generation part and the input terminal of the switch circuit and for detecting electrical power provided from the fuel cell power generation part so as to obtain an output voltage of the fuel cell power generation part;
an electronic load circuit electrically coupled to a node between the fuel cell power generation part and the input terminal of the switch circuit and for performing a current-sinking operation applied to the fuel cell power generation part; and a control circuit electrically coupled to the status detector and for generating a first control signal and a second control signal according to the value of the output voltage of the fuel cell power generation part, wherein the first control signal is for switching the on-off states of the switch circuit and the second control signal is for controlling a current-sinking value of the electronic load circuit from the fuel cell power generation part.

2. The fuel cell system as claimed in claim 1, wherein the switch circuit comprises a power path controller and a tri-terminal switching element; an input terminal of the tri-terminal switching element is electrically coupled to the input terminal of the switch circuit, an output terminal of the tri-terminal switching element is electrically coupled to the output terminal of the switch circuit, and a control terminal of the tri-terminal switching element is electrically coupled to the power path controller; the power path controller is electrically coupled to receive the first control signal, so as to determine the on-off states of the tri-terminal switching element.

3. The fuel cell system as claimed in claim 2, wherein the tri-terminal switching element is a P-type field effect transistor.

4. The fuel cell system as claimed in claim 2, wherein the switch circuit further comprises an NPN bipolar transistor; a base electrode of the NPN bipolar transistor is electrically coupled to receive the first control signal through a first resistor, an emitter electrode of the NPN bipolar transistor is grounded, and a collector electrode of the NPN bipolar transistor is electrically coupled to the power path controller and further electrically coupled to the input terminal of the switch circuit through a second resistor.

5. The fuel cell system as claimed in claim 1, wherein the load supply circuit comprises:

an external load supply circuit for supplying an external load with electrical power; and an internal load supply circuit for supplying an internal load of the fuel cell system with electrical power.

6. The fuel cell system as claimed in claim 1, wherein the electronic load circuit comprises an operational amplifier and a tri-terminal switching element; a non-inverting input terminal of the operational amplifier is electrically coupled to receive the second control signal, an inverting input terminal of the operational amplifier is grounded through a current-sinking resistor, an output terminal of the operational amplifier is electrically coupled to the tri-terminal switching element so as to determine the on-off states of the tri-terminal switching element; an input terminal of the tri-terminal switching element is electrically coupled to the node between the fuel cell power generation part and the input terminal of the switch circuit, and an output terminal of the tri-terminal switching element is grounded through the current-sinking resistor.

7. The fuel cell system as claimed in claim 6, wherein the non-inverting input terminal of the operational amplifier is electrically coupled to receive the second control signal through a resistor-capacitor network.

8. The fuel cell system as claimed in claim 6, wherein the non-inverting input terminal of the operational amplifier is electrically coupled to receive the second control signal through a digital-to-analog converter circuit.

9. The fuel cell system as claimed in claim 6, wherein the tri-terminal switching element is an N-type field effect transistor.

10. A power management method of a fuel cell system, the fuel cell system comprising a fuel cell power generation part, and the power management method comprising:

(a) detecting an output voltage of the fuel cell power generation part, comparing the output voltage with a specific voltage, and generating a first control signal according to the comparison result so as to determine the fuel cell power generation part whether to supply a load with electrical power; and (b) detecting the output voltage of the fuel cell power generation part, comparing the output voltage with an operating voltage, and generating a second control signal according to the comparison result so as to control a current-sinking value from the fuel cell power generation part.

11. The power management method as claimed in claim 10, wherein the step (a) and step (b) are performed one time at intervals, and during each time of the step (a) and step (b) are performed, the step (a) is performed prior to the step (b).

12. The power management method as claimed in claim 10, wherein the step (a) comprises:

when the output voltage is above the specific voltage, determining the fuel cell power generation part not to supply the load with electrical power by the first control signal; and when the output voltage is below or equal to the specific voltage, determining the fuel cell power generation part to supply the load with electrical power by the first control signal.

13. The power management method as claimed in claim 10, wherein the operating voltage is a range and the step (b) comprises:

when the output voltage is above an upper limit of the operating voltage, increasing the current-sinking value subject to the control of the second control signal;

when the output voltage is below a lower limit of the operating voltage, decreasing the current-sinking value subject to the control of the second control signal; and when the output voltage is above or equal to the lower limit and below than or equal to the upper limit, maintaining the current-sinking value.

14. The power management method as claimed in claim 10, wherein the second control signal is a pulse width modulation signal.

* * * * *